Feb. 10, 1959     CLARENCE W. CHEW     2,872,733
LAYOUT INSTRUMENT
Filed March 13, 1956
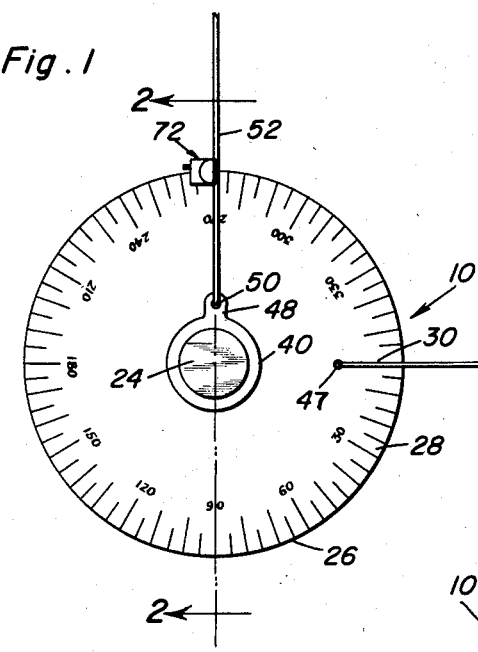
Fig. 1
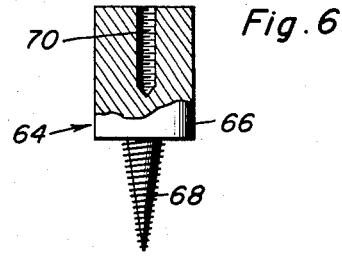
Fig. 6
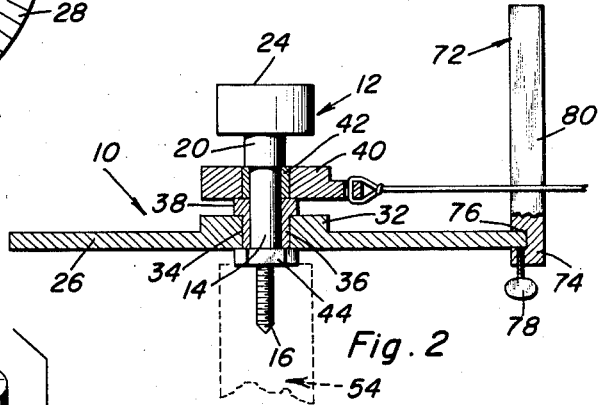
Fig. 2
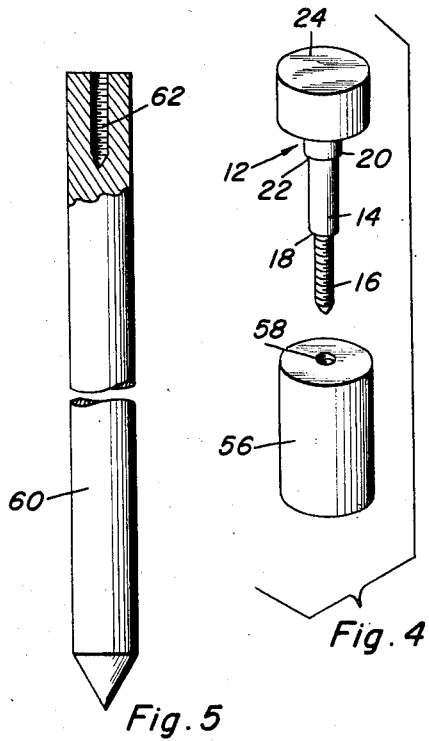
Fig. 3
Fig. 4
Fig. 5
Clarence W. Chew
INVENTOR.

United States Patent Office 2,872,733
Patented Feb. 10, 1959

2,872,733

LAYOUT INSTRUMENT

Clarence W. Chew, Brighton, Ill.

Application March 13, 1956, Serial No. 571,341

1 Claim. (Cl. 33—1)

This invention relates in general to new and useful improvements in geometrical instruments, and more specifically to a layout instrument.

In the laying out of foundation buildings, there is normally established a base line from which all angles and distances are set. In the normal laying out of the foundation, once the base line has been established, a transit is then set up at one of the ends of the base line for the purpose of setting the next line at the desired angle to the base line. The transit is a highly accurate instrument, but at the same time is very expensive. Therefore, in many instances it is necessary that a farmer or other persons doing their own work must have a surveyor come in and lay out their building foundations because of lack of instruments to do the job. The average farmer or other person doing his own work is equipped with no more than a carpenter's square which, while in itself is a very accurate instrument, cannot be used to accurately set angles wherein the lines of the angle extend long distances, such as in the case of a building.

It is therefore the primary object of this invention to provide a layout instrument which is so constructed whereby the cost of manufacture thereof is appreciably less than a transit and at the same time will produce sufficiently accurate results in laying out of angles to permit its use in building foundation layouts and the like.

Another object of this invention is to provide an improved layout instrument which is so constructed whereby it may be accurately positioned on a stake representing one end of a base line and which when provided with a pair of layout strings, one of the strings extending along the base line, may be used in the setting of the next line of the foundation at the desired angle to the base line, there being required in addition to the layout instrument only a conventional steel tape for the purpose of measuring the length of the line being laid out.

Still another object of this invention is to provide an improved layout instrument which is so constructed whereby the lines being utilized in laying out the building foundation and the like may be directly read upon the dial of the layout instrument, one of the lines being connected to the zero mark of the dial and the other lines overlying the dial so as to be the reading line for the instrument.

A further object of this invention is to provide an improved layout instrument which is so constructed whereby it may be accurately positioned and mounted on all types of bases, the layout instrument being provided with interchangeable mounting members which may be secured on metal, wood or directly to the ground.

A still further object of this invention is to provide an improved layout instrument which includes a dial having a connection for a first line at the zero mark thereof and being provided with an adjustable line guide whereby a second line may be properly positioned with respect to the dial from a remote point thus permitting the layout instrument to be used by one person.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a top plan view of the layout instrument which is the subject of this invention and shows connected thereto a pair of layout lines, the lines being disposed at the desired angle with respect to each other;

Figure 2 is a vertical sectional view taken substantially upon the plane indicated by the section line 2—2 of Figure 1 and shows the specific details of construction of the layout instrument;

Figure 3 is an enlarged rotated perspective view of a line guide which is removably carried by the dial of the layout instrument;

Figure 4 is an enlarged exploded perspective view showing the support of the layout instrument removed from the remainder thereof, there being associated with the support a magnetic mounting member;

Figure 5 is an enlarged elevational view of a stake which functions as a mounting member for the layout instrument when it is to be directly mounted in the ground, an intermediate portion of the stake being broken away and the upper portion of the stake being shown in section in order to clearly illustrate the details of the stake; and Figure 6 is an enlarged elevational view with portions broken away and shown in section of a mounting member intended for mounting the layout instrument on a wooden stake or other wooden support material.

Referring now to the drawings in detail, it will be seen that there is illustrated the layout instrument which is the subject of this invention, the layout instrument being referred to in general by the reference numeral 10. The layout instrument 10 includes a support which is referred to in general by the reference numeral 12. The support 12, as is best illustrated in Figure 4, includes an elongated shank 14 which terminates at its lower end in a reduced threaded portion 16, there being formed between the lower end of the shank 14 and the threaded portion 16 a shoulder 18. Disposed above the shank 14 is an enlarged portion 20, there being disposed between the upper end of the shank 14 and the enlarged portion 20 a shoulder 22. The extreme upper end of the support 12 is in the form of an enlarged grip member 24.

The layout instrument 10 also includes a large circular dial 26 which is of the protractor type and which has suitably formed in the upper face thereof a scale graduated in degrees, the scale being referred to by the reference numeral 28. The scale 28 includes a zero mark 30 which will be referred to hereinafter.

In order that the dial 26 may be suitably mounted on the shaft 14, it is provided with an upwardly extending enlarged hub 32. The hub 32 is provided with a central bore 34 in which there is a seated a reduced lower portion 36 of a bushing 38. The upper portion of the bushing 38 overlies the upper end of the hub 32 and functions as a spacer.

Overlying the dial 26 and spaced therefrom by the bushing 38 is a line retaining member 40. The line retaining member 40 has a centrally disposed bushing 42 which is mounted on the shank 14 to permit rotation of the line retaining member 40. The line retaining member 40 and the dial 26 are retained on the shank 14 for rotation by means of a nut 44 which is threadedly engaged in the threaded lower portion 16 which abuts against the shoulder 18. The shoulder 22 prevents upward movement of the line retaining member 40.

In order that a first layout line, such as the layout line 46 may be attached to the dial 26 at the zero mark 30, there is provided in the dial 26 a line receiving aperture 47 which is aligned with the zero mark 30. The line retaining member 40 is provided with an ear 48 having an aperture 50 for receiving a second layout line 52.

In the simplest use of the layout instrument 10, the layout line 46 has one end connected to a stake 54 which is positioned along a base line which the layout line 46 overlies. The center of the support 12 is mounted at an end of the base line from which it is desired to extend another line at a certain angle. In order to set a stake at the desired distance from the corner of the base line on which the layout instrument 10 is mounted, it will be necessary to use a suitable measuring device, such as a steel tape in conjunction with the layout line 52. The layout line 52 is tensioned across the base of the dial 26 in the desired alignment with the scale 28 to produce the proper angle between the layout lines 46 and 52. The next stake (not shown) is in position for utilizing the layout line 52 and the measuring device.

In Figure 2 the layout instrument 10 is shown as being mounted on a suitable support 54 by means of the threaded portion 16. The support 54 may take various forms, including the mounting member 56 which is illustrated in Figure 4. The mounting member 56 is in the form of a magnet, which is of the permanent type, and is provided with an internally threaded bore 58 in the upper end thereof. The mounting member 56 may be used on any steel support surface including upper ends of steel rods and pipe.

Referring now to Figure 5 in particular, it will be seen that there is illustrated an elongated metal stake 60 which functions as a special mounting member for the layout instrument 10. The stake 60 may be of any desired length and is provided at its upper end with an internally threaded bore 62 for receiving the threaded portion 16.

Referring to Figure 6 in particular, it will be seen that there is illustrated a mounting member which is referred to in general by the reference numeral 64. The mounting member 64 is intended to be used in mounting the support 12 on any desired wooden material. The support member 64 includes a body 66 which has formed integral with the lower end thereof a wood screw 68. The body 66 has opening through the upper end thereof an internally threaded bore 70 for receiving the threaded portion 16.

In order that one person may operate the layout instrument 10, there is provided a suitable line guide, which is referred to in general by the reference numeral 72 and which is best illustrated in Figure 3. The line guide 72 includes a base 74 having a notch 76 in one edge thereof for the reception of the dial 26. Extending upwardly from the bottom of the base 74 and intersecting the notch 76 is a clamp screw 78 for clamping the base 74 on the dial 26. Extending upwardly from the base 74 is a line guide element 80.

Referring now to Figure 1 in particular, it will be seen that the line guide 72 is mounted on the dial 26 at the desired angle with respect to the zero mark 30. One may then grip the layout line 52 at the desired distance from the layout instrument 10 and then swing the line 52 until it just comes into contact with the line guide element 80. At this time, the layout line 52 is at the desired angle to the layout line 46 and the next stake of the foundation may be set.

It will be readily apparent that many uses for the layout instrument in addition to laying out building foundations will develop.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A layout instrument for laying out building foundations and the like, said layout instrument comprising a support, a dial carried by said support, means on said dial for the terminal attachment of a first layout line, a line retainer mounted on said support above said dial for rotation about said support and relative to said dial, means carried by said line retainer for the terminal attachment of a second layout line, and a guide for the second layout line, the guide including a base having clamp means for clampingly attaching said guide to said dial in an adjusted position, and a line guide element projecting upwardly from said base, said dial including indicia, said line guide element presenting a flat face alignable with the indicia on said dial and engageable with said second layout line to facilitate the positioning of the second layout line from a remote point.

References Cited in the file of this patent

UNITED STATES PATENTS

| | | |
|---|---|---|
| 313,494 | Hale | Mar. 10, 1885 |
| 819,350 | Janssen et al. | May 1, 1906 |
| 1,307,987 | Rived | June 24, 1919 |
| 2,586,074 | Memluck | Feb. 19, 1952 |
| 2,685,739 | Cole | Aug. 10, 1954 |